INVERTED GROUNDED EMITTER TRANSISTOR AMPLIFIER

Filed June 7, 1949

INVENTOR
H. L. BARNEY
BY Harry C. Hart
ATTORNEY

Patented Nov. 17, 1953

2,659,773

UNITED STATES PATENT OFFICE 2,659,773

INVERTED GROUNDED EMITTER TRANSISTOR AMPLIFIER

Harold L. Barney, Madison, N. J., assignor to Bell Telephone Laboratories, Incorporated, New York, N. Y., a corporation of New York Application June 7, 1949, Serial No. 97,676

6 Claims. (Cl. 179—170)

This invention relates to signal translation networks utilizing semiconductor amplifiers as active elements.

A principal object of the invention is to provide substantial power amplification in each of two opposite directions of transmission.

A more specific object is to provide a circuit element which gives substantially equal power amplification in each of two opposite directions of transmission.

A related object is to enable two-way communication to be carried out by way of a two-wire line and associated unattended repeater equipment, without resort to switching apparatus.

Another object of the invention is to reduce the disturbing effect of current measuring equipment on a network in which a current is to be measured.

Another object of the invention is to supply a load with a current which, while it is dependent on a signal voltage, is independent of the impedance of the load.

Application Serial No. 11,165 of John Bardeen and W. H. Brattain, filed February 26, 1948, now abandoned, describes and claims an amplifier unit of novel construction, comprising a small block of semiconductor material, such as N-type germanium, with which are associated three electrodes. One of these, known as the base electrode, makes low resistance contact with a face of the block. It may be a plated metal film. The others, termed emitter and collector, respectively, preferably make rectifier contact with the block. They may, in fact be point contacts. The emitter is biased to conduct in the forward direction and the collector is biased to conduct in the reverse direction. "Forward" and "reverse" are here used in the sense in which they are understood in the rectifier art. When a signal source is connected between the emitter and the base and a load is connected in the collector circuit, it is found that an amplified replica of the voltage of the signal source appears across the load. The aforementioned application contains detailed directions for the fabrication of the device.

The device may take various forms, all of which have properties which are generally similar although they differ in important secondary aspects. Examples of such other forms are described and claimed in an application of J. N. Shive, Serial No. 44,241, filed August 14, 1948, and in an application of W. E. Kock and R. L. Wallace, Jr., Serial No. 45,023, filed August 19, 1948, now Patent 2,560,579, issued July 17, 1951.

The device in all of its forms has received the appellation "transistor," and will be so designated in the present specification.

In the Bardeen-Brattain application above referred to there is a tabulation of the performance characteristics of three sample transistors. In one of these, it appears that increments of signal current which flow in the circuit of the collector electrode as a result of the signal current increments which flow in the circuit of the emitter electrode, exceed the latter in magnitude. This current amplification feature of transistors has become the general rule, and appears in nearly all transistors fabricated. It is discussed in detail in United States Patent 2,524,035, which issued October 3, 1950, on an application of John Bardeen and W. H. Brattain, Serial No. 33,466, filed June 17, 1948, which is a continuation in part of the earlier application of the same inventors, which earlier application has now been abandoned. It is of such importance in connection with the present invention, as well as others, that the ratio of these increments has been given a name, "$\alpha$." In the present invention, the presence of such a current gain factor, not heretofore available in conventional vacuum tube amplifiers, is turned to account in the construction of a translation network having various new and useful properties, a principal one among these being that it is capable of providing substantial power amplification in either or both of two opposite directions.

The analogy of the transistor amplifier in its original form, that is with the base electrode common to the input and output circuits, the input signal being applied between the emitter and the base and the output being taken from the collector and the base, to a vacuum tube amplifier circuit of the so-called grounded grid configuration has already been noted. Similarly, an analogy may be drawn between the conventional grounded cathode vacuum tube amplifier circuit and a transistor amplifier with grounded emitter. In the same way the grounded collector transistor amplifier is analogous in its operation to the grounded anode or "cathode follower" vacuum tube circuit. These three circuit configurations have long been accepted as the only ones in which a vacuum tube amplifier may be satisfactorily operated to give voltage and power gain simultaneously.

In an application of B. McMillan, Serial No. 96,485, filed June 1, 1949, there is described a transistor amplifier circuit of a new configuration having certain novel features and advantages.

In this circuit the collector is common to the input and output circuits, the input signal being applied to the emitter and the output being taken from the base. It is, in effect, an "inverted" grounded collector transistor amplifier. An application of R. M. Ryder, Serial No. 96,500, filed June 1, 1949, describes certain new results which are obtainable with the circuit configuration of the McMillan application when the values of the associated network elements are appropriately selected. In particular, the Ryder application is based upon the discovery that, with appropriate parametric values for the inverted grounded collector circuit, equal amplification may be obtained simultaneously in each of two opposite directions.

The present invention deals with another transistor amplifier circuit configuration, namely, one in which the emitter electrode is common to the input and output circuits, the signal being applied in a novel manner to the collector electrode and the output being taken from the base electrode. With suitable values of the associated impedance elements, this circuit has certain striking new characteristics offering marked advantages. First, with appropriate values of the associated impedance elements, the input impedance of the circuit may be made to have a substantially zero value. It is well known that current measuring equipment should have the lowest possible value of input impedance, in order that the introduction of such equipment into a circuit in which flows a current to be measured shall have the least possible disturbing effect on the network. The circuit configuration of the invention is therefore well suited for use in current measuring equipment.

For another thing, by adjustment of associated impedance elements to different values, the output impedance of the circuit of the invention may be caused to appear substantially infinite. With these adjustments the new circuit is suitable for use as a "constant current source"; that is, a network which, when a load is connected to its output terminals and a signal source to its input terminals, delivers an output current to the load which, while it is dependent on the magnitude of the signal source, is independent of the impedance of the load.

By still other adjustments of the values of the associated impedance elements, the amplifier circuit of the invention may be made to furnish power amplification simultaneously in each of two opposite directions; and, specifically, these amplifications may be made alike. An amplifier of this sort, evidently, is well suited for use as a repeater in a two-way, two-wire transmission system. It amplifies signals received from either end of the line and transmits them at a higher power level to the other end, and this without resort to any switching apparatus, either of the signal-controlled or the voice-controlled variety. Amplifiers adjusted in this manner can be employed as repeaters in such a transmission line and cascaded in any desired numbers.

The particular adjustment of impedance values which results in like power amplification in both directions is that the resistance of the emitter circuit, which includes both the internal emitter resistance and any external resistance which may be connected in series with the emitter is equal to one half of the mutual resistance or "transimpedance" of the transistor.

The invention together with various other features and advantages which it offers will be fully apprehended from the following detailed description of certain illustrative embodiments taken in connection with the appended drawings, in which.

Figure 1:
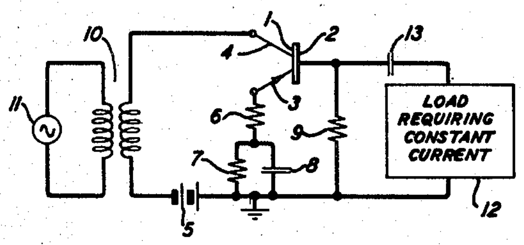
Fig. 1 is a schematic circuit diagram of an inverted grounded emitter transistor amplifier network which is adjusted to have a substantially infinite output impedance, and serves as a constant current source.

Referring now to the drawings, Fig. 1 shows a transistor amplifier of the grounded emitter configuration. The transistor itself comprises a block 1 of semiconductor material such as germanium having a low resistance base electrode 2 in contact with one face thereof and two point contact electrodes in closely spaced contact engaging the opposite face. The contact point 3 is the emitter contact and the nearby contact 4 is the collector contact. As fully described in the aforementioned applications of John Bardeen and W. H. Brattain, the transistor operates best in the conventional manner when the emitter electrode 3 is biased positively with respect to the base by a fraction of a volt while the collector 4 is biased negatively by 40 to 100 volts. In the figure a battery 5 supplies the large negative bias to the collector while the emitter bias is supplied as the difference between the voltage drop across two resistors 6, 7, which are connected to the emitter 3 and another resistor 9 which is connected to the base 2. The resistor 7 may be shunted, for signal frequency purposes, by a condenser 8, in the manner described in an application of H. L. Barney, Serial No. 49,951, filed September 18, 1948, and thereafter abandoned in favor of a continuation-in-part application of H. L. Barney, Serial No. 123,507, filed October 25, 1949, now Patent No. 2,647,958 issued August 4, 1953.

In accordance with the invention, however, the standard practice for a grounded emitter network is departed from by applying the input signal not to the base electrode but to the collector electrode. This may be done by any convenient means, for example by the interposition of an input transformer 10 whose primary winding is connected to the terminals of a signal source 11 while its secondary winding is connected, by way of the collector bias battery 5, to the collector electrode 4 and to ground.

A load 12 requiring constant current is connected to the output terminals which, in accordance with the invention are the emitter (or ground) and the base. In the usual case it is preferable that steady biasing current be excluded from such a load. For this purpose a condenser 13 is shown in series with the load which blocks direct current but offers only a negligible impedance to signal frequency load current.

Figure 2:
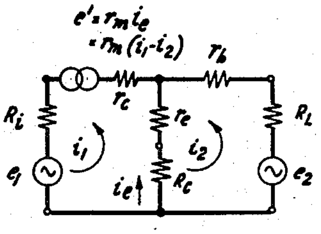
Fig. 2 is an equivalent network diagram of an inverted grounded emitter transistor amplifier.

Fig. 2 is an equivalent circuit diagram of the transitor amplifier of Fig. 1. Here the resistors $r_c$, $r_e$, and $r_b$, represent the internal resistances of the collector, the emitter and the base, respectively, of the transistor. A resistor $R_e$ is shown in series with $r_e$, for reasons which will appear. The amplification properties of the transistor are represented by a fictitious internal generator of voltage $$e'=r_m i_e \quad (1)$$

where $i_e$ is the emitter current
$r_m$ is the mutual resistance of the transistor As the emitter current $i_e$ is the difference between the two currents $i_1$ and $i_2$ of Fig. 2, the fictitious internal generator voltage may be expressed as $$e'=r_m(i_1-i_2) \quad (2)$$

A terminating resistor $R_i$ and an external source of electromotive force $e_1$ are connected to the left-hand terminals of the equivalent network, while a terminating resistor $R_L$ and another source of electromotive force $e_2$ are connected to the right-hand terminals of the network.

In the light of the equivalent network of Fig. 2, the operation of the constant current network of Fig. 1, and the manner in which the values of the various impedance elements are to be adjusted to obtain optimum performance can be explained as follows:

The requirement that the current through the load shall be constant, that is, that it shall be independent of the impedance of the load itself and of the voltage across it, is equivalent to a requirement that the impedance of the transistor network looking into its output terminals shall have the characteristic of an infinite resistance. That an adjustment of the values of the parameters of the network producing this result is possible may be seen in a qualitative sense from the following:

The total voltage drop in the right-hand mesh of Fig. 2 is evidently $$i_2(r_b+R_L)+(i_2-i_1)(r_e+Re) \quad (3)$$

Suppose, now, that $e_2$ is increased in such a direaction as to increase $i_2$. This increases the factor $(i_2-i_1)$ of the second term of (3), which is negative. To the same extent it reduces the factor $(i_1-i_2)$, which is positive, and so reduces the magnitude of the equivalent electromotive force which is given by Equation 2. But this is the electromotive force which is responsible for causing the current $i_1$ to flow, so that $i_1$ is in turn reduced. Thus the second term of Equation 3 for the voltage drop in the output mesh of Fig. 2 is increased both because $i_2$ is increased and because $i_1$ is reduced. This change in the second term of (3) is in the direction to oppose the postulated change in $e_2$ and may be sufficient to fully absorb it so that there need be no change in the first term of Equation 3 and consequently no net change in the voltage applied to $R_L$. In the limiting case, when $i_1$ diminishes to zero or goes negative for an infinitesimal increase in $i_2$, the output impedance of the transistor network is infinite.

The precise conditions under which this result is obtained appear as consequences of the following computations:

Referring to Fig. 2, the mesh current equations are $$i_1(R_i+r_c+r'_e)-i_2r'_e=e_1+r_m(i_1-i_2) \quad (4)$$

and $$i_1r'_e+i_2(R_L+r_b+r'_e)=e_2 \quad (5)$$

where $$r'_e=r_e+R_e \quad (6)$$

and $R_e$ is the external resistor in series with the emitter.

It imposes no restriction on the computation of the output impedance to put $R_L=0$ and $e_1=0$. Making these simplifications and solving Equations 4 and 5 for $i_2$ in terms of $e_2$ gives, for the output impedance, $$Z_{out}=r_b+\frac{r'_e(r_c+R_i)}{r'_e+r_c+R_i-r_m} \quad (7)$$

Evidently, from Equation 7, $Z_{out}$ becomes infinite when the denominator of the fraction is zero; i. e., when $$r_m=r'_e+r_c+R_i \quad (8)$$

or $$Ri=r_m-r'_e-r_c \quad (9)$$

Thus, for $Z_{out}=\infty$, $r_m$ must be larger than $r_c$, and therefore $\alpha$, which is defined approximately as $$\alpha=\frac{r_m}{r_c} \quad (10)$$

must be greater than unity. If, in addition, $\alpha$ exceeds unity by such a margin that $$r_m>r'_e+r_c \quad (11)$$

then $R_i$ must be adjusted to satisfy Equation 9, thus giving a value of infinity for $Z_{out}$.

That the adjustment defined by Equation 9 makes the output current independent of the load impedance, while still leaving it dependent on the input electromotive force, may be seen as follows. Solution of Equations 4 and 5 for the output current in terms of the input electromotive force gives $$i_2=\frac{r_1r'_e}{(R_i+r'_e+r_c-r_m)(r'_e+r_b+R_L)+r'_e(r_m-r'_e)} \quad (12)$$

If, however, $r_m$ has the value given by (8) above, then Equation 12 reduces to $$i_2=\frac{e_1r'_e}{r'_e(r_m-r'_e)}=\frac{e_1}{r_m-r'_e} \quad (13)$$

which is seen to be independent of $R_L$ but linearly dependent on $e_1$. It is also to be noted that if the denominator of (13) is made sufficiently small, a very large value of $i_2$ is obtained for a given value of $e_1$. In physical terms, this means a very large value of the transconductance of the transistor network. To make the denominator of 9 small, it is only necessary to select the magnitude of the external emitter resistance $R_e$, until $r_m$ is very slightly in excess of $r'_e$ as given by (6).

With different values of the circuit elements, the inverted grounded emitter transistor amplifier presents an input impedance which is essentially zero in magnitude.

Referring again to the equivalent network of Fig. 2, assume first that $R_L$ is infinite; that is, the output is open-circuited. Also assume $R_i=0$ so that the input electromotive force is applied directly between the collector and the emitter.

The sum of the voltage drops in the input mesh is equal to the input voltage $e_1$. These voltage drops comprise a positive voltage drop across $r'_e$ and $r_c$, which is equal to $(r'_e+r_c)i_1$ and a negative voltage drop across the fictitious internal generator equal to $r_mi_1$. If $r_m$ is sufficiently large so that these voltage drops add up to zero, the input impedance of the network is zero. Thus $$Z_{in}=\frac{e_1}{i_1}=r'_e+r_c-r_m=0 \quad (14)$$

or $$r_m=r'_e+r_c \quad (15)$$

Here again, $r_m$ must be greater than $r_c$ in order to obtain the desired result of a zero input impedance and therefore $\alpha$ must be somewhat greater than unity.

If, instead of zero, a finite value of $R_L$ be assumed, for a practical case, a current $i_2$ flows in the second mesh, and the current through the emitter is reduced to $(i_1-i_2)$, thus reducing the negative voltage drop in the fictitious generator $e'$. In order that the negative voltage drop may then still be equal to the positive voltage drop in the input mesh, it is necessary for the value of $r_m$ to be still larger than that given by (15). This in turn requires the value of $\alpha$ to be appreciably greater than unity. With the assumption that $e_2=0$ and $R_i=0$ and letting $R_L$ assume a finite value, the Equations 4 and 5 may be solved for the input impedance $Z_{in}$, which is equal to $$\frac{e_1}{i_1}$$

and the result is $$Z_{in}=\frac{e_1}{i_1}=r_e+\frac{(r'_e-r_m)(R_L+r_b)}{R_L+r_b+r'_e}. \qquad (16)$$

This input impedance is zero when $R_L$ is adjusted to make $$R_L=\frac{r'_e r_c}{r_m-r'_e-r_c}-r_b \qquad (17)$$

Despite the fact that the input impedance of the network is zero, power flows into the load. The amount of this power may be calculated by setting $R_i$ and $e_2$ both equal to zero in Equations 4 and 5 and solving for $i_2$ in terms of $i_1$. This gives $$i_2=\frac{i_1 r'_e}{R_L+r_b+r'_e} \qquad (18)$$

from which the output power is $$i_2^2 R_L=\frac{i_1^2 r'^2_e R_L}{(R_L+r_b+r'_e)^2} \qquad (19)$$

The addition of the external resistor $R_e$ in series with the emitter is effective in increasing this output power as compared with the value it would have without this resistor. Thus, with a typical transistor whose constants are $r_e=500$ ohms
$r_c=15{,}000$ ohms
$r_b=100$ ohms
$r_m=40{,}000$ ohms and, with no external emitter resistance, $$r'_e=r_e=500$$

The value of $R_L$ as calculated from Equation 17 for this case is 206 ohms, and the output power as calculated from Equation 19 is then $80i_1^2$. But, if an external resistor $R_e$ of 1,500 ohms be connected in series with the emitter, then, $$r'_e=r_e+R_e=2000 \text{ ohms}$$

Now $R_L$ is calculated from Equation 17 to be 1,200 ohms, and the output power becomes, from Equation 19, $440i_1^2$. For very much larger values of resistance added in the emitter electrode lead, the output power is reduced, reaching a value of zero at the point where $r_m$ is just equal to the added resistance increased by the sum of $r_c$ and $r_e$.

Figure 3:
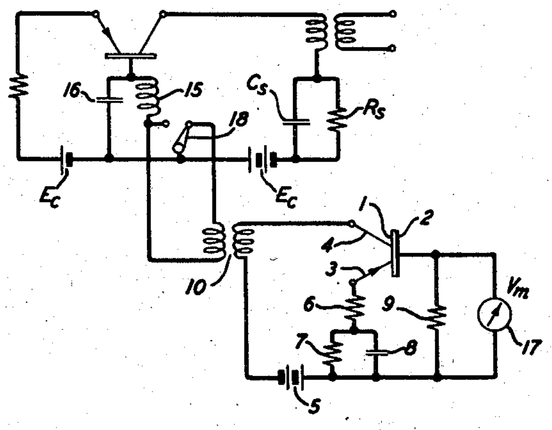
Fig. 3 is a schematic circuit diagram showing an inverted grounded emitter transistor amplifier network which is adjusted to have a zero input impedance, employed as a current measuring device; and, Fig. 4 is a schematic circuit diagram of a two-way, two-wire transmission system employing a plurality of inverted grounded emitter transistor amplifiers coupled together in cascade.

The circuit of Fig. 3 illustrates an application of the inverted grounded emitter amplifier to the measurement of current in the resonant circuit of an oscillator, here exemplified by a grounded-base transistor oscillator network of the type which forms the subject-matter of an application of H. L. Barney, Serial No. 67,159, filed December 24, 1948, which oscillates at the frequency to which the tank circuit comprising a coil 15 and a condenser 16 are tuned. In this example, it is considered undesirable to introduce any appreciable impedance into the resonant circuit, by insertion of the measuring circuit. The measuring circuit, comprising an inverted grounded emitter transistor amplifier with output load consisting of a meter 17 shunted by a resistor 9 has essentially zero input impedance by virtue of adjustments of the load impedance as described above. The input to the measuring circuit is taken through a transformer 10 in order to prevent the flow of biasing current called for by the measuring transistor, through the tuned circuit of the oscillating transistor. The transformer is preferably one having a minimum of leakage reactance and a high coupling coefficient between windings in order to minimize its effect when inserted between the resonant circuit and the input to transistor. Operation of switch 18 to the left leaves the oscillation generator in the normal condition. When the switch 18 is operated to the right, the input terminals of the current measuring circuit are connected in series with the coil of the resonant circuit, in which condition the deflection of a meter, when suitably calibrated indicates the magnitude of the current in the resonant circuit. Alternatively a cathode ray oscilloscope or other indicating means may be employed in place of the meter to indicate the wave shape of the current flowing in the resonant circuit. Other applications of the measuring circuit of Fig. 3, in cases where zero or very low input impedance is required of the measuring circuit in order to avoid disturbing the operation of the circuit to be measured, may suggest themselves to those skilled in the art.

It has been shown in the preceding examples, Figs. 1 and 3, that transmission may occur through an inverted grounded emitter transistor amplifier, and in some cases power gains may be realized. It is commonly known that transmission through a grounded emitter circuit from base to collector may be accompanied by substantial power gain. It is shown below that with certain specified adjustments of circuit parameters, the grounded emitter circuit may be used to transmit simultaneously in both directions with substantial gains, and, as a special case, that the gains in the two directions may be made equal.

The insertion gains of the amplifier in the two directions may be calculated using Equations 4 and 5. Solving first for the current in the second mesh of Fig. 2 for a given value of $e_1$ with $e_2=0$, gives, as before, $$i_2=\frac{e_1 r'_e}{(R_i+r_c+r'_e-r_m)(R_L+r_b+r'_e)+r'_e(r_m-r'_e)} \qquad (12)$$

If the amplifier stage were not in circuit between $R_i$ and $R_L$, the current $i_2$ would have been $$i'_2=\frac{e_1}{R_i+R_L} \qquad (20)$$

The ratio of the current after insertion of the amplifier, to the current before insertion, which is here referred to as insertion gain, is then Insertion gain (left to right) =

$$\frac{r'_e(R_i+R_L)}{(R_i+r_c+r'_e-r_m)(R_L+r_b+r'_e)+r'_e(r_m-r'_e)} \qquad (21)$$

For the opposite direction of transmission, right to left in Fig. 2, the current $i_1$ is calculated from (4) and (5) with $e_1=0$, giving $$i_1=\frac{e_2(r'_e-r_m)}{(R_i+r_c+r'_e-r_m)(R_L+r_b+r'_e)+r'_e(r_m-r'_e)} \quad (22)$$

The current in the left end terminating resistor $R_i$ without the insertion of the amplifier would have been $$i_1=\frac{e_2}{r_i+R_L} \quad (23)$$

The ratio of currents before and after insertion of the amplifier is thus the insertion gain Insertion gain (right to left) =

$$\frac{(r'_e-r_m)(R_i+R_L)}{(R_i+r_c+r'_e-r_m)(R_L+r_b+r'_e)+r'_e(r_m-r'_e)} \quad (24)$$

Inspection of Equations 21 and 24 shows that the expressions for gain in the two directions differ only in one term in the numerator, this term being $r'_e$ in (21) and $(r'_e-r_m)$ in (24). Therefore Equation 21 may be divided by Equation 24 giving as the ratio of the insertion gains in the two cases $$\frac{\text{Insertion gain, left-right}}{\text{Insertion gain, right-left}}=\frac{r'_e}{r'_e-r_m} \quad (25)$$

In conventional transistors, $r_e$ is much smaller than $r_m$, so that without the addition of an external resistor $R_e$, the term $(r'_e-r_m)$ would have a much larger absolute value than $r'_e$, and would be of opposite sign, indicating a reversal of phase in one direction of transmission, but not in the other. When, however, the effective magnitude of $r_e$ is increased by the inclusion of a resistance $R_e$ in series with $r_e$, and when this resistor is adjusted so that $$r'_e=r_e+R_e=\frac{r_m}{2} \quad (26)$$

then the ratio of gains in the two directions becomes $$\text{Insertion gain ratio}=\frac{r_e+R_e}{r_e+R_e-r_m}=\frac{\frac{r_m}{2}}{-\frac{r_m}{2}}=-1 \quad (27)$$

Thus the gains in the two directions become equal, and reversal of phase takes place in transmission in one direction as compared with the transmission in the other direction.

As an example to illustrate the above, constants may be assumed for a transistor and associated circuit elements as follows:

$r_e$=500 ohms
$r_b$=100 ohms
$r_c$=15,000 ohms
$r_m$=40,000 ohms
$R_i$=1,000 ohms
$R_L$=40,000 ohms
$R_e$=19,500 ohms Here, Equation 26 has been satisfied by selection of the magnitude of $R_e$.

The insertion gain in decibels, either left to right or, neglecting reversal of phase, right to left is given, from Equation 24 by $$\text{Gain}=20\log\frac{(r_e+R_e-r_m)(R_i+R_L)}{(R_i+r_c+r_e+R_e-r_m)(R_L+r_b+r_e+R_e)+(r_e+R_e)(r_m-r_e-R_e)} \quad (28)$$

Substituting the above assumed values gives $$\text{Gain}=14.0\text{ decibels} \quad (29)$$

Thus, for small signal voltages which do not exceed the linear range of the transistor characteristics, transmission of signals may proceed in both directions simultaneously without intermodulation or other interference.

Figure 4:
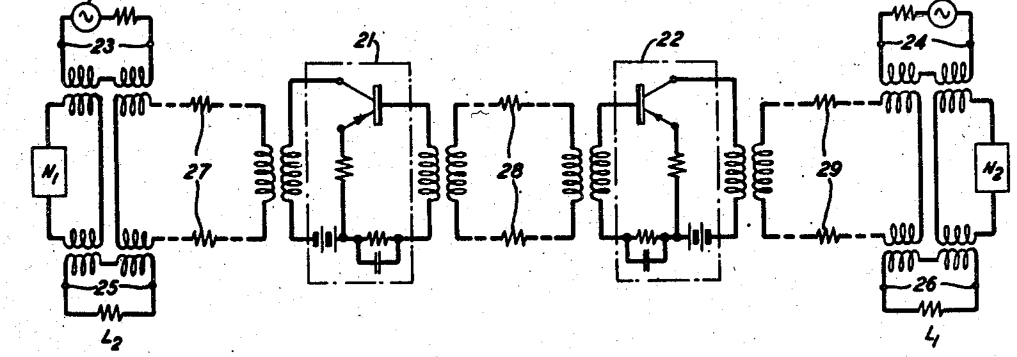

Fig. 4 illustrates the application of such a bilateral amplifier in a two-wire transmission system such as a long toll circuit for speech. The properties of the bilateral amplifier stage just described are used to compensate for losses in the intervening sections of line between the several stages. Two such stages 21, 22 are shown in Fig. 4, coupled to the line by transformers at input and output. At each end of the line are connected hybrid coil terminating sets, with the sources $S_1$, $S_2$ connected to terminals 23, 24 and the receivers or loads $L_1$, $L_2$ connected to terminals 25, 26. The networks $N_1$, $N_2$ are adjusted to balance the impedance of the line connected to the hybrid coils, so as to suppress direct transmission from each source to the load at the same end of the line in the customary manner. In transmission from left to right in Fig. 4, signals from the source 21 divide in the left end hybrid coil, with half the energy going into the balancing termination $N_1$, and the other half to the line. The signal is attenuated by the line impedances 27, 28, 29 and is amplified by the two transistor amplifier stages 21, 22, to compensate for this attenuation. On reaching the other hybrid terminating set $N_2$ the energy again divides, half going to the load $L_2$ and half into the source $S_2$. Transmission of signals from the source $S_2$ in the opposite direction, i. e., from right to left in Fig. 4, proceeds in an analogous manner to that just described, and as stated above may take place simultaneously with transmission from left to right.

In the figure the left-hand amplifier stage 21 is shown as of the inverted type for transmission from left to right, while the right-hand amplifier stage 22 is shown as the inverted type for transmission from right to left. The roles of these two amplifier stages are reversed for transmission in the opposite direction.

Although it is entirely possible to connect any number or all of a group of cascaded grounded emitter transistor amplifiers either in the inverted circuit configuration or in the conventional circuit configuration, it is preferred to invert alternate members of the group. Thus, when, as in the example shown there are two or any even number of amplifier stages, the signal sources $S_1$, $S_2$ and the loads $L_1$, $L_2$ are presented with similar impedances in the sense that if, at either end of the line the impedance looking into the line is that of a transistor collector, so too is the impedance looking into the other end of the line. Similarly, if the stages are so connected that one of the terminating networks $N_1$, $N_2$ sees a base impedance, so too does the other terminating network. If, on the other hand, an odd number of stages is employed and alternate ones are inverted, then the sources and loads necessarily see different line impedances, and impedance matching devices such as transformers are advantageously employed to prevent power loss due to impedance mismatch.

More important, however, than the consideration of symmetry as between each terminating network and the line of cascaded amplifiers, is the consideration that the output impedance of any stage of the sequence automatically matches the input impedance of the stage to which it is coupled.

A virtue of this arrangement is that by the proper selection of transformer turn ratios in well-known manner it can be arranged that the base-to-emitter terminals of each transistor amplifier, whether they be regarded as input terminals or as output terminals, can be made to see an impedance, looking into the line which interconnects two successive stages, of the proper value to enable the transistor amplifier to furnish equal gain in both directions. The same is true of the other pair of terminals of the amplifier, namely the collector-to-emitter terminals. Thus, referring to the foregoing example of a grounded emitter amplifier which, with appropriate values of the circuit elements, gives a gain of 14 decibels both in the forward direction and in the reverse direction, it is a simple matter to select the turn ratios of the various transformers which couple the several amplifier stages to the intervening line sections in such a way that the collector-to-emitter terminals of each stage see an impedance of 1,000 ohms while at the same time the base-to-emitter terminals of each amplifier stage see an impedance of 40,000 ohms. These values of 1,000 ohms and 40,000 ohms, respectively, are the values of $R_t$ and $R_L$ which enable the typical transistor whose internal parameters are given in the above example to furnish equal gain simultaneously in both directions.

Various other uses and adaptations of the inverted grounded emitter amplifier of the invention will occur to those skilled in the art.

What is claimed is:

1. An amplifier of which the active element includes a transistor comprising a semiconductive body having a base electrode, an emitter electrode, and a collector electrode all in operative contact therewith, a source connected to supply potentials to said electrodes for transistor operation, input terminals connected to the emitter and to the collector, respectively, output terminals connected to the emitter and to the base, respectively, and a load connected to said output terminals, the resistance of said load being proportioned according to the formula $$R_L=\frac{r'_e r_c}{r_m-r'_e-r_c}-r_b$$

where $r'_e=r_e+R_e$
$r_e$ is the emitter resistance of the transistor
$r_c$ is the collector resistance of the transistor
$r_b$ is the base resistance of the transistor
$r_m$ is the mutual resistance of the transistor
$R_e$ is an external resistor connected in series with the emitter, said amplifier being characterized by an input impedance of substantially zero magnitude.

2. An amplifier of which the active element includes a transistor comprising a semiconductive body having a base electrode, an emitter electrode, and a collector electrode all in operative contact therewith, a source connected to supply potentials to said electrodes for transistor operation, input terminals connected to the emitter and to the collector, respectively, output terminals connected to the emitter and to the base, respectively, and a terminating resistor connected to said input terminals, the resistance of said terminating resistor being proportioned according to the formula $$R_t=r_m-r'_e-r_c$$

where $r'_e=r_e+R_e$
$r_e$ is the emitter resistance of the transistor
$r_c$ is the collector resistance of the transistor
$r_m$ is the mutual resistance of the transistor
$R_e$ is an external resistor connected in series with the emitter, said amplifier being characterized by an output impedance of substantially infinite magnitude.

3. An amplifier of which the active element includes a transistor comprising a semiconductive body having a base electrode, an emitter electrode, and a collector electrode all in operative contact therewith, a source connected to supply potentials to said electrodes for transistor operation, input terminals connected to the emitter and to the collector, respectively, output terminals connected to the emitter and to the base, respectively, a load connected to said output terminals, and a signal source and a terminating resistor being connected to said input terminals, the resistance of said terminating resistor being proportioned according to the formula $$R_t=r_m-r'_e-r_c$$

where $r'_e=r_e+R_e$
$r_e$ is the emitter resistance of the transistor
$r_c$ is the collector resistance of the transistor
$r_m$ is the mutual resistance of the transistor
$R_e$ is an external resistor connected in series with the emitter, said amplifier being characterized by a load current which is dependent on the signal of the source but is independent of the resistance of the load.

4. A bilateral amplifier for transmitting signals with equal power gains in a forward direction and in a reverse direction, said amplifier including a transistor comprising a semi-conductive body, an emitter electrode, a collector electrode, and a base electrode all in operative contact with said body, a first signal input-output circuit including said base electrode and said emitter electrode for input signals in said forward direction and output signals in said reverse direction, a second input-output circuit including said collector electrode and said emitter electrode for input signals in said reverse direction and output signals in said forward direction, said first and second signal input-output circuits having a common portion including said emitter electrode wherein the external portion $R_e$ of said common circuit has an impedance which is proportioned to satisfy the relation $$R_e=\frac{r_m}{2}-r_e$$

where $r_e$ is the emitter resistance of the transistor
$r_m$ is the mutual resistance of the transistor.

5. In combination with a signal source and a load, a bidirectional transmission system which comprises a plurality of bidirectional transistor amplifier stages coupled together in cascade, each of said stages comprising a three-electrode transistor amplifier of the grounded-emitter configuration, the base electrode of one stage being coupled to the base electrode of the following stage, the collector electrodes of the first and last stages of the plurality being coupled to the source and to the load, respectively.

6. Apparatus as defined in claim 5, wherein the number of said stages is even, whereby the gain of said entire system has the same value for signals transmitted in each of two opposite directions despite inequalities between the gain of any single stage for signals transmitted in one direction and the gain of said stage for signals transmitted in the opposite direction.

HAROLD L. BARNEY.

References Cited in the file of this patent

UNITED STATES PATENTS

| Number | Name | Date |
|---|---|---|
| 1,745,175 | Lilienfeld | Jan. 28, 1930 |
| 2,067,048 | Gill et al. | Jan. 5, 1937 |
| 2,431,333 | Labin | Nov. 25, 1947 |
| 2,476,323 | Rack | July 29, 1949 |
| 2,524,035 | Bardeen et al, | Oct. 3, 1950 |

FOREIGN PATENTS

| Number | Country | Date |
|---|---|---|
| 439,457 | Great Britain | Dec. 6, 1935 |